(12) United States Patent
Hagiwara et al.

(10) Patent No.: US 9,954,627 B2
(45) Date of Patent: Apr. 24, 2018

(54) QUADRATURE DEMODULATOR AND WIRELESS RECEIVER

(71) Applicant: KABUSHIKI KAISHA TOSHIBA, Tokyo (JP)

(72) Inventors: Yousuke Hagiwara, Kanagawa (JP); Toshiyuki Yamagishi, Tokyo (JP); Toshiya Mitomo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 92 days.

(21) Appl. No.: 15/212,706

(22) Filed: Jul. 18, 2016

(65) Prior Publication Data

US 2017/0070299 A1 Mar. 9, 2017

(30) Foreign Application Priority Data

Sep. 9, 2015 (JP) .................................. 2015-177761

(51) Int. Cl.
*H04B 17/00* (2015.01)
*H04B 17/21* (2015.01)
*H04L 1/24* (2006.01)

(52) U.S. Cl.
CPC .............. *H04B 17/21* (2015.01); *H04L 1/248* (2013.01)

(58) Field of Classification Search
CPC ................................ H04B 17/21; H04L 1/248
See application file for complete search history.

(56) References Cited

U.S. PATENT DOCUMENTS

| | | | |
|---|---|---|---|
| 6,636,722 B1 * | 10/2003 | Dalebroux | H04B 17/20 324/601 |
| 6,670,900 B1 | 12/2003 | Zhang | |
| 8,792,593 B2 | 7/2014 | Yamagishi | |
| 2005/0026577 A1 * | 2/2005 | Chiu | H04B 1/123 455/130 |
| 2006/0291549 A1 * | 12/2006 | Seppinen | H04B 17/21 375/227 |
| 2012/0236975 A1 * | 9/2012 | Yamagishi | H03G 3/3068 375/346 |
| 2013/0156141 A1 * | 6/2013 | Eo | H04B 1/0021 375/346 |

FOREIGN PATENT DOCUMENTS

| | | |
|---|---|---|
| JP | 2003008674 A | 1/2003 |
| JP | 2014053687 A | 3/2014 |

* cited by examiner

*Primary Examiner* — Freshteh N Aghdam
(74) *Attorney, Agent, or Firm* — Patterson & Sheridan, LLP

(57) ABSTRACT

A quadrature demodulator includes a quadrature demodulating circuit configured to generate an analog in-phase signal and an analog quadrature signal based on an output signal of a low noise amplifier, and a controller configured to cause a thermal noise, instead of the output signal of the low noise amplifier, to be input to the quadrature demodulating circuit, when a correction parameter to correct a mismatch between the in-phase and quadrature signals is being calibrated.

20 Claims, 2 Drawing Sheets

QUADRATURE DEMODULATOR AND WIRELESS RECEIVER

CROSS-REFERENCE TO RELATED APPLICATION

This application is based upon and claims the benefit of priority from Japanese Patent Application No. 2015-177761, filed Sep. 9, 2015, the entire contents of which are incorporated herein by reference.

FIELD

Embodiments described herein relate generally to a quadrature demodulator and a wireless receiver.

BACKGROUND

In the related art, there is a wireless receiver having a quadrature demodulator. A wireless receiver of one such type has a function of correcting a phase difference between an in-phase component and a quadrature component of a wireless signal (hereinafter, referred to as "IQ mismatch"), so that accuracy of received data is improved.

The IQ mismatch represents a gain error and a phase error between an I-channel signal and a Q-channel signal. This IQ mismatch is caused by inaccuracies in a 90° phase shifter in the quadrature demodulator and difference in path length between the I channel and the Q channel.

A method to correct the IQ mismatch would be to calculate a correction amount of the IQ mismatch using a phase shift circuit in a loop back circuit from the transmission side to the reception side. However, since this method requires the phase shift circuit, the total size of the wireless receiver would become larger and manufacturing cost thereof would be increased.

Another method to correct the IG mismatch would be using a thermal noise which is included in an output from a low noise amplifier. This method can improve correction accuracy of the IQ mismatch without enlarging the total size of the wireless receiver.

However, according to the method that uses thermal noise, when a disturbance wave signal such as a reception signal is generated and contained in the thermal noise, it may not be possible to detect the IQ mismatch. That is, during the reception of the disturbance wave signal, the IQ mismatch may not be correctable. For this reason, a correction parameter of the IQ mismatch has to be calculated after confirming that there is no disturbance wave signal. In other words, it is not possible to correct the IQ mismatch while the disturbance wave signal is being generated.

DETAILED DESCRIPTION

Here, one or more example embodiments provide a quadrature demodulator and a wireless receiver which can detect IQ mismatch based on a thermal noise signal regardless of generation of a disturbance wave signal.

In general, according to an embodiment, a quadrature demodulator includes a quadrature demodulating circuit configured to generate an analog in-phase signal and an analog quadrature signal based on an output signal of a low noise amplifier, and a controller configured to cause a thermal noise, instead of the output signal of the low noise amplifier, to be input to the quadrature demodulating circuit, when a correction parameter to correct a mismatch between the in-phase and quadrature signals is being calibrated.

Hereinafter, embodiments are described with reference to the drawings.

First Embodiment

<Configuration>

Figure 1:
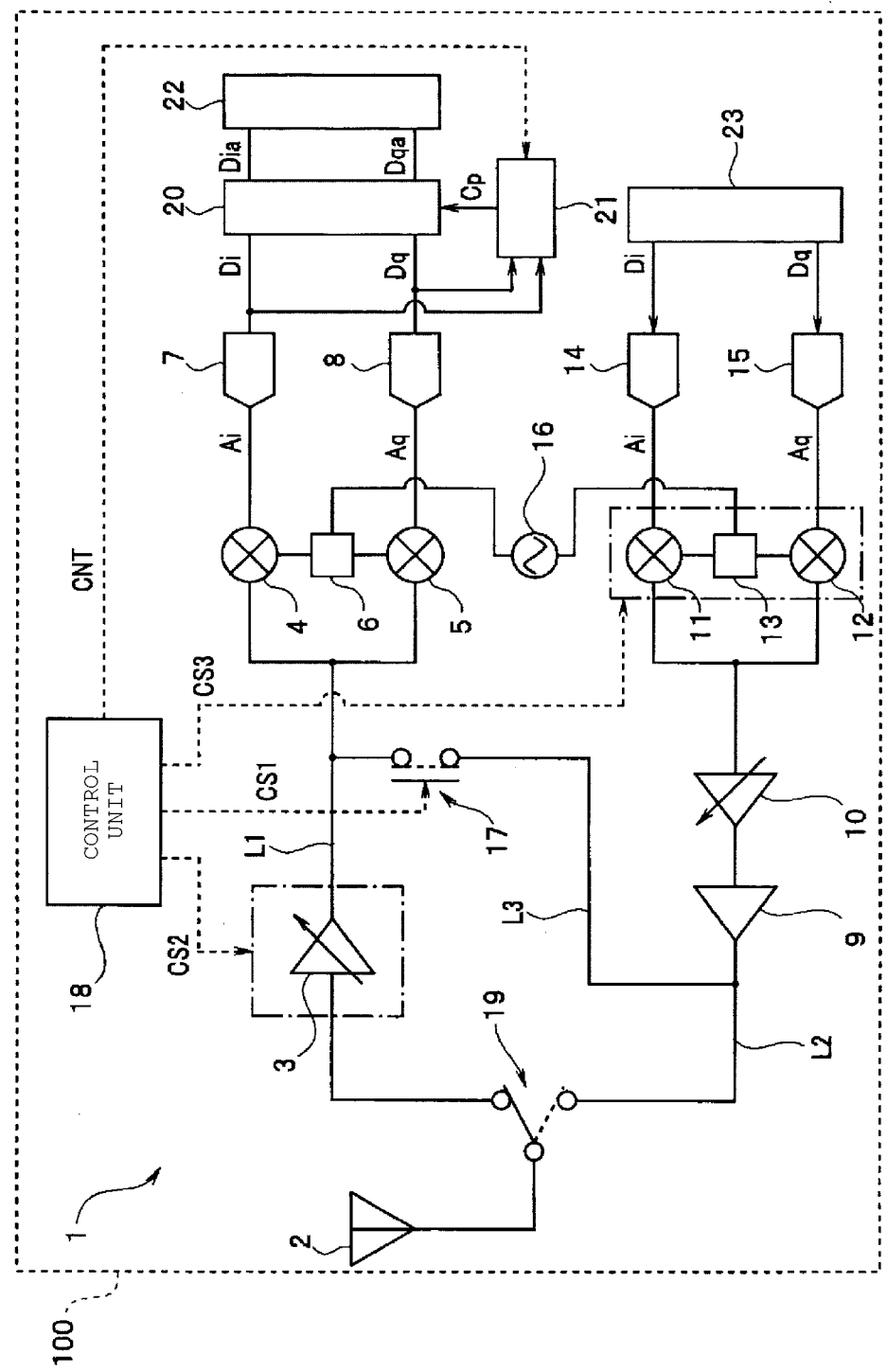
FIG. 1 is a schematic block diagram illustrating a configuration of a quadrature modulator or demodulator according to a first embodiment.

FIG. 1 is a schematic block diagram illustrating a configuration of a quadrature modulator or demodulator according to the example embodiment.

A quadrature modulator and demodulator 1 is provided in a wireless communication apparatus 100 which corresponds to a wireless receiver and a wireless transmitter, and includes an antenna 2, a low noise amplifier (hereinafter, referred to as a LNA) 3, mixers 4 and 5, a phase shifter 6, analog-digital converters (hereinafter, referred to as an ADC) 7 and 8, an amplifier 9, a variable gain amplifier (hereinafter, referred to as a VGA) 10, mixers 11 and 12, a phase shifter 13, digital-analog converters (hereinafter, referred to as a DAC) 14 and 15, an oscillator 16, a switch 17, a control unit 18, an antenna switching switch 19, a correction unit 20, a correction control unit 21, a demodulation unit 22, and a modulation unit 23.

The antenna 2 is connected to the antenna switching switch 19 that switches a transmission state into a receiving state.

The antenna switching switch 19 is controlled by the control unit 18, and is connected to the LNA 3 and the amplifier 9.

The LNA 3 is a circuit that amplifies an output signal of the antenna 2 with low noise. The output signal of the LNA 3 is connected to an input terminal of the mixer 4 and an input terminal of the mixer 5 via a signal line L1.

The phase shifter 6 is connected to the mixers 4 and 5. The circuit which includes the mixers 4 and 5, and the phase shifter 6 is a quadrature demodulating unit.

The phase shifter 6 is connected to an oscillator 16 which is a local oscillator. The local signal from the oscillator 16 is input to the phase shifter 6, and the phase shifter 6 outputs signals which have phases mutually shifted by 90 degrees to the mixers 4 and 5.

Each of outputs of the mixers 4 and 5 is connected to each of input terminals of the ADCs 7 and 8.

The mixer 4 generates an analog signal (hereinafter, referred to as an analog I signal Ai) of an in-phase component by multiplying the output signal of the LNA 3 by a local signal, and outputs the generated analog signal to the ADC 7, and the ADC 7 outputs a digital signal (hereinafter, referred to as a digital I signal Di) of the in-phase component.

The mixer 5 generates an analog signal (hereinafter, referred to as an analog Q signal Aq) of a quadrature component by multiplying a local signal by the output signal the LNA 3, and outputs the generated analog signal to the ADC 8, and the ADC 8 outputs a digital signal (hereinafter, referred to as a digital Q signal Dq) to the quadrature component.

That is, the quadrature demodulating unit, which includes the mixers 4 and 5, and the phase shifter 6, demodulates the output signal of the low noise amplifier 3, and generates the analog I signal of the in-phase component and the analog Q signal of the quadrature component. In addition, the ADC 7 converts the analog I signal into the digital I signal of the in-phase component, and ADC 8 converts the analog Q signal into the digital Q signal of the quadrature component.

The digital I signal Di and the digital Q signal Dq are input to the correction unit 20 and the correction control unit 21. The correction control unit 21 calculates, for example, an amount of IQ amplitude mismatch and an amount of IQ phase mismatch by an arithmetic expression which is disclosed in Japanese Patent No. 5,361,927 and then outputs a correction parameter Cp including the amount of IQ amplitude mismatch and the amount of IQ phase mismatch to the correction unit 20. An operation of the correction control unit 21 is controlled by a correction control signal CNT from the control unit 18. That is, as disclosed in Japanese patent No. 5,361,927, the correction control unit 21 configures a correction parameter generation unit which calculates and generates a correction parameter based on the digital I signal and the digital Q signal.

The correction unit 20 performs the IQ mismatch correcting calculation with the correction parameter Cp. The correction unit 20 corrects the IQ mismatch between the digital I signal Di and the digital Q signal Dq, and then provides the corrected I signal Dia and the corrected Q signal Dqa to the demodulation unit 22.

That is, as disclosed in Japanese Patent No. 5,361,927, the correction unit 20 performs a primary conversion calculation with the correction parameter Cp, corrects the IQ mismatch between the digital I signal and the digital Q signal, and then generates the correction I signal Dia and the correction Q signal Dqa.

The demodulation unit 22 generates a demodulation signal based on the input correction I signal Dia and correction Q signal Dqa.

As described, in the reception mode, the wireless signal which is received by the antenna 2 is amplified by the LNA 3, and an analog I signal Ai and an analog Q signal Aq are generated by the mixers 4 and 5. Each of the analog I signal Ai and the analog Q signal Aq is converted into the digital I signal Di and the digital Q signal Dq by the ADCs 7 and 8. The digital I signal Di and the digital Q signal Dq which are output from the ADCs 7 and 8 are input to the correction control unit 21 such that the correction parameter Cp is calculated. The correction unit 20 performs the correction of the IQ mismatch with respect to the digital I signal Di and the digital Q signal Dq based on the correction parameter Cp, and then the corrected signals are outputs to the demodulation unit 22, thereby generating the demodulation signal.

The modulation unit 23 generates the digital I signal Di of the in-phase component and the digital Q signal Dq of the quadrature component based on input transmitted data rows, and then supplies the generated digital I signal Di of the in-phase component and the digital Q signal Dq of the quadrature component to each of input terminals of the DACs 14 and 15.

Each of the outputs of the DACs 14 and 15 is connected to the input terminal of the mixer 11 and the input terminal of the mixer 12. Each of the DACs 14 and 15 generates the analog I signal Ai and the analog Q signal Aq, and outputs the generated analog I signal Ai and the analog Q signal Aq to the input terminal of the mixer 11 and the input terminal of the mixer 12.

The phase shifter 13 is connected to the mixers 11 and 12. The circuit including the mixers 11 and 12, and the phase shifter 13 is a quadrature modulator.

The phase shifter 13 is connected to the oscillator 16. The local signal is input to the phase shifter 13 from the oscillator 16, and the phase shifter 13 outputs signals which have phases mutually shifted by 90 degrees to the mixers 11 and 12.

The outputs of the mixers 11 and 12 are connected to the input terminal of the VGA 10. The mixer 11 outputs the signal obtained by multiplying the transmission signal from the DAC 14 to the VGA 10 by the local signal. The mixer 12 outputs the signal obtained by multiplying the transmission signal from the DAC 15 to the VGA 10 by the local signal.

The gain of the VGA 10 can be controlled by the control unit 18, and the output of the VGA 10 is connected to the amplifier 9. The output of the amplifier 9 is connected to the antenna switching switch 19 via a signal line L2.

As described, the amplifier 9 and the VGA 10 are connected to the mixers 11 and 12 of the quadrature modulator, and are amplifiers for amplifying the outputs of the mixers 11 and 12.

In transmission mode, the transmission signal is generated in the modulation unit 23, and is converted into the analog I signal Ai and the analog Q signal Aq in the DACs 14 and 15. The analog I signal Ai and the analog Q signal Aq are quadrature-modulated by the mixers 11 and 12, amplified by the VGA 10 or the like, and then transmitted from the antenna 2.

The switch 17 is provided on a signal line L3 which connects the signal line L1 between the LNA 3 and the mixers 4 and 5, and the signal line L2 between the amplifier 9 and the antenna switching switch 19. The switch 17 is normally in an off state, but when detecting the IQ mismatch, the switch 17 is turned on, that is, placed in a conductive state by a control signal CS1 from the control unit 18.

The switch 17 is controlled to be opened and closed by the control signal CS1 from the control unit 18. That is, the switch 17 is a switch that provides the output of the amplifier 9 to the mixers 4 and 5 of the quadrature demodulating unit.

In addition, it is possible to turn off the LNA 3 by a control signal CS2 from the control unit 18. For example, the control unit 18 outputs the control signal CS2, turns off a switch that controls the power supply to the circuit of the LNA 3, and thereby turns off the LNA 3, which stops its operation. In addition, if the control unit 18 does not output the control signal CS2, the LNA 3 is turned on by turning on the switch that controls the power supply to the circuit of the LNA 3.

Similarly, it is possible to turn off the quadrature modulating unit by turning off mixers 11 and 12, and the phase shifter 13 by a control signal CS3 from the control unit 18. For example, the control unit 18 outputs the control signal CS3, turns off a switch for controlling the power supply to the circuit of the mixers 11 and 12, and the phase shifter 13. Thereby, it is possible to turn off the mixers 11 and 12, and the phase shifter 13, which stops its operation. In addition, if the control unit 18 does not output the control signal CS3, the mixers 11 and 12, and the phase shifter 13 are turned on by turning on the switch for controlling the power supply to the circuit of the mixers 11 and 12, and the phase shifter 13.

When the mixers 11 and 12, and the phase shifter 13 are turned off, the VGA 10 amplifies the thermal noise and outputs the thermal noise signal to the amplifier 9. That is, the thermal noise signal is included in an output signal output from the amplifier 9 in a case where the quadrature modulator, which includes the mixers 11 and 12 and the phase shifter 13, does not perform a modulating operation.

The control unit 18 controls the entire wireless communication apparatus 100 including the quadrature demodulator 1.

Accordingly, under the control of the control unit 18, the quadrature modulator and demodulator 1 controls the antenna switching switch 19 such that the transmission and reception are performed by the wireless signal. When detecting the IQ mismatch, under the control of the control unit 18, the quadrature modulator and demodulator 1 outputs the above-described control signals CS1, CS2, and CS3 to the switch 17, the LNA 3, and the mixers 11 and 12, and the phase shifter 13, and generates and outputs a correction control signal CNT that controls the operation of the correction control unit 21.

<Operation>

Next, a detecting operation of the IQ mismatch based on the thermal noise signal in the quadrature modulator or demodulator 1 is described.

The control unit 18 performs a detecting process of the IQ mismatch during a correction time interval. The correction time interval may be a time when it is determined that the wireless communication apparatus 100 does not perform the transmission and reception, a time during a test mode, or the like.

When the wireless communication apparatus 100 operates during the correction time interval, the control unit 18 outputs the control signals CS1, CS2, and CS3 to the quadrature modulation unit which includes the switch 17, the LNA 3, and the mixers 11 and 12, and the phase shifter 13.

As a result, the switch 17 is turned on by the control signal CS1, the LNA 3 is turned off by the control signal CS2, and the quadrature modulation unit, which includes the mixers 11 and 12, and the phase shifter 13, is also turned off by the control signal CS3.

That is, the control unit 18 outputs the control signal CS2 so as to control the LNA 3 not to perform the amplifying operation when detecting the IQ mismatch, and outputs the control signal CS3. Thereby, the quadrature modulator including the mixers 11 and 12, and the phase shifter 13 is controlled not to perform the modulation operation. Further, when detecting the IQ mismatch between the analog I signal of the in-phase component and the analog Q signal of the quadrature component, the control unit 18 performs switching control of the switch 17 such that the output of the amplifier 9 is input to the mixers 4 and 5 which configure the quadrature demodulating unit, and then controls in such a manner that instead of the output signal of the low noise amplifier 3, the thermal noise signal is applied to the mixers 4 and 5.

The LNA 3 is turned off, and thus a reception signal which is a disturbance wave signal is not input to the mixers 4 and 5. Therefore, at the time of detecting the IQ mismatch, the disturbance wave is not input to the mixers 4 and 5.

In addition, the mixers 11 and 12, and the phase shifter 13 are turned off, and the quadrature modulator for the transmitting operation is not operated, and thus a load of the oscillator 16 matches the load on the oscillator encountered in the receiving state. That is, the mixers 11 and 12, and the phase shifter 13 are turned off, and thus are not affected by a modulation circuit for the transmitting operation. Thereby, it is possible to detect and correct the IQ mismatch with the same load as the load when the mixers 11 and 12, and the phase shifter 13 are operated by only the demodulation circuit for the reception operation.

Since the mixers 11 and 12, and the phase shifter 13 are turned off, the signals output from the VGA 10 and the amplifier 9 are the thermal noise signals. The control unit 18 controls the gain of the VGA 10 so as to make the thermal noise signal to in addition, predetermined size.

The thermal noise signal is supplied to the mixers 4 and 5 from the amplifier 9 via a switch 17. The analog I signal Ai and the analog Q signal Aq which are output from the mixers 4 and 5 are converted into the digital I signal Di and the digital Q signal Dq by the ADCs 7 and 8 and then input to the correction control unit 21, so as to calculate the correction parameter Cp. The correction unit 20 performs the correction of the IQ mismatch with respect to the digital I signal Di and the digital Q signal Dq based on the correction parameter Cp, and then the correction I signal Dia and correction Q signal Dqa in which the IQ mismatch is corrected are output to the demodulation unit 22.

Thus, according to the embodiment, it is possible to provide the quadrature demodulator and the wireless receiver which can detect the IQ mismatch based on the thermal noise signal regardless of whether or not a disturbance wave signal is present.

Second Embodiment

In the first embodiment, in order to detect the IQ mismatch of the quadrature demodulator, the output of the quadrature modulator is used as the thermal noise source. However, in the second embodiment, a thermal noise source which is independent of the quadrature modulator is used.

In addition, in second embodiment, the same elements as the quadrature modulator or demodulator 1 in the first embodiment are denoted by the same reference numerals and only the description for different configurations is given.

Figure 2:
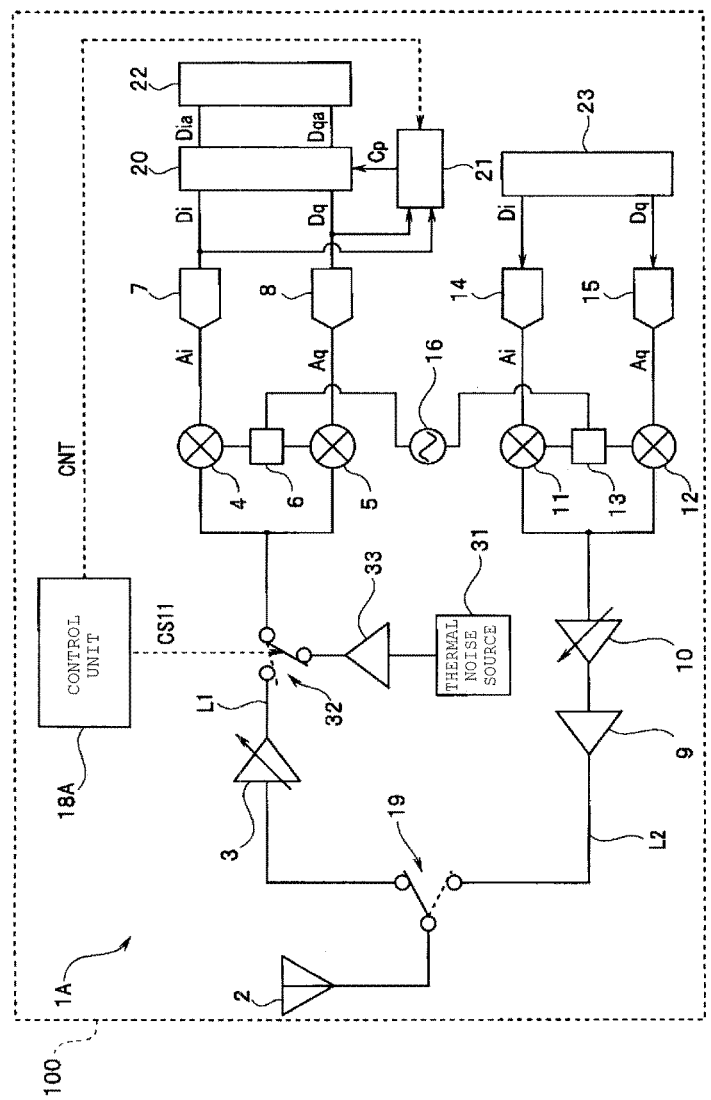
FIG. 2 is a schematic block diagram illustrating a configuration of a quadrature modulator or demodulator according to a second embodiment.

FIG. 2 is a schematic block diagram illustrating a configuration of the quadrature modulator or demodulator according to the second embodiment. As illustrated in FIG. 2, a quadrature modulator or demodulator 1A which is included in a wireless communication apparatus 100 includes a thermal noise source 31.

Thermal noise source 31 is a circuit that includes a diode, a resistor, and the like, and outputs a thermal noise signal by inputting a predetermined current into the diode or the like.

A switch 32 is provided on a signal line L1, and the thermal noise source 31 and the switch 32 are connected to each other via an amplifier 33. Therefore, the thermal noise signal which is output from the thermal noise source 31 is amplified to be a predetermined size by the amplifier 33. Note that, in a case where an output level of the thermal noise signal which is output from the thermal noise source 31 is sufficiently large, the amplifier 33 is not necessarily used.

The switch 32 is a switch that selectively switches inputs to the mixers 4 and 5 which configure the quadrature demodulating unit output of the LNA 3 to any one of outputs of the amplifier 33.

The switch 32 is controlled to be opened and closed by a control signal CS11 from a control unit 18A. When the control signal CS11 is not received, the switch 32 has a first state in which the output of the LNA 3 is supplied to the mixers 4 and 5, and when the control signal CS11 is received, the switch 32 has a second state in which the output of the amplifier 33 is supplied to the mixers 4 and 5.

That is, the control unit 18A controls the switch 32 to be switched such that the thermal noise source 31 or the output of the amplifier 33 is input to the mixers 4 and 5 by the control signal CS11 when detecting the IQ mismatch.

Next, in the quadrature modulator and demodulator 1A, detecting operation of the IQ mismatch based on the thermal noise signal is described. The control unit 18A operates during a correction interval which is the same as the timing of the detecting process for the IQ mismatch described in first embodiment. The correction interval may be a time when it is determined that the wireless communication apparatus 100 does not perform the transmission and reception or a time during a test mode.

The control unit 18 outputs the control signal CS11 to the switch 32 at a predetermined timing.

The switch 32 enters the second state in which the amplified thermal noise signal, that is, the output of the amplifier 33 is supplied to the mixers 4 and 5 by the control signal CS11. When detecting IQ mismatch, the output from the LNA 3 is not supplied to the mixers 4 and 5, and a reception signal which is the disturbance wave signal is not input to the mixers 4 and 5.

The thermal noise signal is supplied to the mixers 4 and 5 from the switch 32. The analog I signal Ai and the analog Q signal Aq which are output from the mixers 4 and 5 are respectively converted into the digital I signal Di and the digital Q signal Dq with the ADCs 7 and 8, and input to the correction control unit 21 to calculate a correction parameter Cp. The correction unit 20 performs the correction of the IQ mismatch with respect to the digital I signal Di and the digital Q signal Dq based on the correction parameter Cp. Then, the correction I signal Dia and correction of signal Dqa in which the IQ mismatch has been corrected are output to the demodulation unit 22.

Therefore, according to the embodiment, it is possible to provide the quadrature demodulator and the wireless receiver which can detect the IQ mismatch based on the thermal noise signal whether or not the disturbance wave signal is present.

Note that, in the above, described two embodiments, the correction interval for performing the detecting process of the IQ mismatch may be the time when the wireless communication apparatus does not perform the transmission and reception or the time during the test mode. However, in a case of a transceiver using a multiple-input and multiple-output (MIMO) technique of corresponding to a plurality of antennas, when an antenna for reception is in a non-use state among the plurality of antennas, only on the antenna for receiving in the non-use state may be subjected to the described detecting process of the IQ mismatch.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quadrature demodulator, comprising:
    a quadrature demodulating circuit configured to generate an analog in-phase signal and an analog quadrature signal based on an output signal of a low noise amplifier; and
    a controller configured to cause a thermal noise, instead of the output signal of the low noise amplifier, to be input to the quadrature demodulating circuit, when a correction parameter to correct a mismatch between the in-phase and quadrature signals is being calibrated.

2. The quadrature demodulator according to claim 1, further comprising:
    an amplifier connectable to an output terminal of a mixer that combines an in-phase signal and a quadrature signal output from a quadrature modulating circuit, wherein
    the thermal noise is output from the amplifier when the mixer is disabled.

3. The quadrature demodulator according to claim 2, further comprising:
    a switch disposed along a path between the amplifier and the quadrature demodulating circuit, wherein
    the controller turns on the switch when the correction parameter is being calibrated.

4. The quadrature demodulator according to claim 2, wherein the controller disables the mixer when the correction parameter is being calibrated.

5. The quadrature demodulator according to claim 1, wherein
    the controller disables the low noise amplifier when the correction parameter is being calibrated.

6. The quadrature demodulator according to claim 1, further comprising:
    a thermal noise source configured to generate the thermal noise.

7. The quadrature demodulator according to claim 6, further comprising:
    an amplifier disposed along a path between the thermal noise source and the quadrature demodulating circuit, wherein
    the thermal noise generated by the thermal noise source is amplified by the amplifier, and the amplified thermal noise is input to the quadrature demodulating circuit.

8. The quadrature demodulator according to claim 6, further comprising:
    a switch configured to connect the quadrature demodulating circuit to either the low noise amplifier or the thermal noise source, wherein
    the controller controls the switch to connect the quadrature demodulating circuit to the thermal noise source when the correction parameter is being calibrated.

9. The quadrature demodulator according to claim 1, further comprising:
    an analog-to-digital conversion circuit configured to convert the analog in-phase signal and the analog quadrature signal to a digital in-phase signal and a digital quadrature signal, respectively;
    a correction parameter generating circuit configured to generate the correction parameter based on the digital in-phase signal and the digital quadrature signal; and
    a correction circuit configured to correct the digital in-phase signal and the digital quadrature signal based on the correction parameter.

10. A wireless communication module, comprising:
    an antenna;
    a low noise amplifier configured to amplify a signal received by the antenna;
    a quadrature demodulating circuit configured to generate an analog in-phase signal and an analog quadrature signal based on an output signal of the low noise amplifier;
    an analog-to-digital conversion circuit configured to convert the analog in-phase signal and the analog quadrature signal to a digital in-phase signal and a digital quadrature signal, respectively;

a correction parameter generating circuit configured to generate a correction parameter to correct a mismatch between the digital in-phase signal and the digital quadrature signal, based on the digital in-phase signal and the digital quadrature signal;

a correction circuit configured to correct the digital in-phase signal and the digital quadrature signal based on the correction parameter; and a controller configured to cause a thermal noise, instead of the output signal of the low noise amplifier, to be input to the quadrature demodulating circuit, when the correction parameter to correct the mismatch is being calibrated.

11. The wireless communication module according to claim 10, further comprising:

a quadrature modulating circuit configured to generate an in-phase signal and a quadrature signal;

a mixer configured to combine the in-phase signal and the quadrature signal from the quadrature modulating circuit; and an amplifier with which the combined signal is amplified, wherein the thermal noise is output from the amplifier when the mixer is disabled.

12. The wireless communication module according to claim 11, further comprising:

a switch disposed along a path between the amplifier and the quadrature demodulating circuit, wherein the controller turns on the switch when the correction parameter is being calibrated.

13. The wireless communication module according to claim 11, wherein the controller disables the mixer when the correction parameter is being calibrated.

14. The wireless communication module according to claim 10, wherein the controller disables the low noise amplifier when the correction parameter is being calibrated.

15. The wireless communication module according to claim 10, further comprising:

a thermal noise source configured to generate the thermal noise.

16. The wireless communication module according to claim 15, further comprising:

an amplifier disposed along a path between the thermal noise source and the quadrature demodulating circuit, wherein the thermal noise generated by the thermal noise source is amplified by the amplifier, and the amplified thermal noise is input to the quadrature demodulating circuit.

17. The wireless communication module according to claim 15, further comprising:

a switch configured to connect the quadrature demodulating circuit to either the low noise amplifier or the thermal noise source, wherein the controller controls the switch to connect the quadrature demodulating circuit to the thermal noise source when the correction parameter is being calibrated.

18. A method for calibrating a correction parameter to correct an IQ mismatch of signals, comprising:

generating a thermal noise;

outputting the thermal noise to a quadrature demodulating circuit that is disposed to receive an output signal of a low noise amplifier;

preventing the output signal of the low noise amplifier from being output to the quadrature demodulating circuit;

generating, at the quadrature demodulating circuit, an analog in-phase signal and an analog quadrature signal based on the thermal noise;

converting the analog in-phase signal and the analog quadrature signal to a digital in-phase signal and a digital quadrature signal, respectively; and generating a correction parameter to correct a mismatch between the in-phase signal and the quadrature signal based on the digital in-phase signal and the digital quadrature signal.

19. The method according to claim 18, wherein the thermal noise is generated by operating an amplifier connected to an output terminal of a mixer of a quadrature modulating circuit and disabling the mixer.

20. The method according to claim 18, wherein the output signal of the low noise amplifier is prevented from being output to the quadrature demodulating circuit, by disabling the low noise amplifier.

* * * * *